Figure 1:
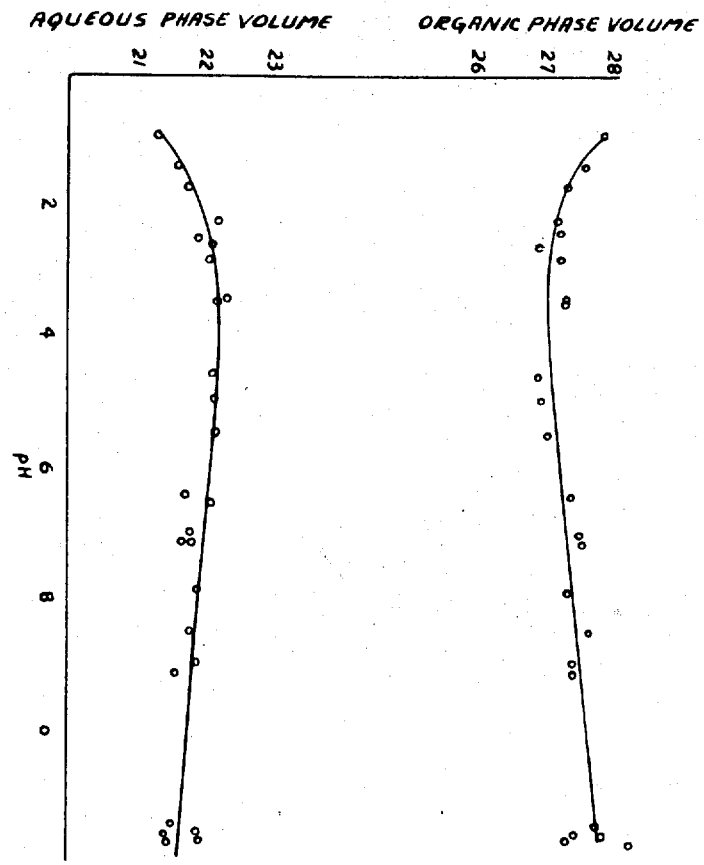

United States Patent Office 3,451,807
Patented June 24, 1969

3,451,807
SOLVENT EXTRACTION PROCESS FOR THE RECOVERY OF METAL VALUES
William G. Scribner, Kettering, Ohio, and George K. Schweitzer, Knoxville, Tenn., assignors to Monsanto Research Corporation, St. Louis, Mo., a corporation of Delaware
Filed Nov. 29, 1966, Ser. No. 597,622
Int. Cl. C22b 3/00, 15/00; C07f 15/00
U.S. Cl. 75—117          18 Claims This invention relates to solvent extraction processes and more particularly to the recovery of certain metal values of the alkaline earth and transition metal series from aqueous solutions.

A number of methods are available for the recovery of metals from solutions, and many of them are based on the use of extractants which serve as ligands for the formation of chelates with the metals to be extracted. The beta-diketones have been widely investigated as the chelate-forming agents; however, the general applicability of the diketones to solvent extraction processes has been limited by the insolubility of some of the chelates in the usual solvents. Also, a number of the metal/diketone chelates tend to react in the aqueous solution to give products, probably hydrates, which possess poor solubility in hydrophobic organic solvents.

Extraction efficiency is dependent upon the pH of the solution, and the reversible chelate-forming reaction may often be very slow in attaining equilibrium. Thus, according to J. Stary et al., Analyst, chim. Acta 28,277 (1963), the following are not extracted by 0.1 M acetylacetone in benzene at any pH: calcium (II), cadmium (II), bismuth (III), chromium (III); also, using the same reagent solution only the following partial extractions are obtained: zinc (II), less than 10%; cobalt (II), less than 30%; copper (II), 90% maximum; magnesium (II), less than 60%; manganese (II), less than 30%; molybdenum (VI), less than 35%; nickel (II), less than 20%; lead (II), less than 80%; lanthanum (III), less than 20%; mercury (II), less than 25%; and titanium (IV), about 35%.

The alkaline earth metals and the metals of the transition series have proved to be the least amenable to solvent extraction into benzene and related solvents as the diketonates. Because a number of the metal chelates possess volatilities which permit separation by gas chromatography, the recalcitrance of these metals to such extraction has impeded wide application of the combined approach to isolation of these metals.

Now we have found that metal values selected from the class consisting of the metals of Groups II–A, II–B and III–B of the Periodic Arrangement of Elements, copper (II), lead (II), chromium (III), iron (III), cobalt (II), nickel (II), and manganese (II) are readily and efficiently extracted from aqueous solutions containing said values by the process which comprises contacting the aqueous solution with a solution of trifluoroacetylacetone in an alkanol of from 4 to 8 carbon atoms as the organic phase to transfer said metal values from the aqueous solution to said organic phase, and separating the resulting metal value-loaded organic phase from the metal value-depleted aqueous phase at an equilibrium pH of 4 to 7. For recovery of the metal trifluoroacetylacetonate from the organic phase, there may be employed the customary isolating procedures, e.g., stripping the solute from the organic phase, fractional crystallization, chromatography, etc.

Use of the alkanol as solvent for the trifluoroacetylacetone permits the recovery of certain metal values in yields which cannot be achieved with other common solvents, e.g., chloroform, benzene or toluene. Thus, whereas use of trifluoroacetylacetone in toluene gives only a 2.1% extraction of cobalt value, replacement of the toluene by butanol under the same conditions results in 99.5% extraction for equal phase volumes. Likewise, the combination of trifluoroacetylacetone, rather than of another dione, with the alkanol is critical. For example, the use of a 0.25 molar solution of trifluoroacetylacetone in butanol results in a distribution ratio of calcium ion which is about twice that obtained with the same concentration of hexafluoroacetylacetone in butanol.

Alkanols which are suitable for the present purpose include the branched or unbranched 4–8 carbon atom paraffinic alcohols, e.g., butanol, isobutanol, pentanol, 3-methylbutanol, hexanol, heptanol, 2-ethylhexanol, 2,3-dimethylbutanol, octanol, etc. Use of these alcohols with the trifluoroacetylacetone permits solution of the required quantity of the chelating dione and serves to dissolve the chelate; at the same time the alcohols are sufficiently water-insoluble or water-immiscible to enable separation of the loaded alcohol phase from the depleted aqueous phase.

The quantity of trifluoroacetylacetone which is present in the starting solution should, of course, be sufficient to react with all of the metal ion which is to be recovered, since recovery of the metal value depends upon a reaction of two or three moles of the trifluoroacetylacetone with one mole of the metal ion. In order to assure the greatest possible recovery, an excess of the chelating agent is advantageously employed.

The present method generally provides for substantially complete recovery of said metal values from aqueous solutions. The metals may be present in the form of the usual water-soluble salts, e.g., chlorides, nitrates or perchlorates. Accordingly, the process is useful for extracting these metal values from waste solutions containing the same. Because of the very high extraction efficiency, the present process is suitable for the recovery of trace amounts of the metals. In the instances where a single extraction does not result in quantitative recovery, a second extraction usually does.

Determination of extraction efficiency in a solvent recovery process requires measurement of the metal ion concentration in the loaded organic phase and/or in the depleted aqueous phase. This may be done by titrating the aqueous phase and by spectrophotometry of the organic phase. To perform an experimentally sound extraction study, both phases should be analyzed after equilibration and numerous extractions should be performed in order to determine the effect of shaking time and equilibrium pH. Accordingly, the radiotracer technique is of decided advantage in expediency. The metal ion concentration data are used to calculate the distribution ratio, which value is equal to the concentration of the metal species in the organic phase divided by the concentration of the metal species in the aqueous phase.

When butanol is employed as the solvent for trifluoroacetylacetone, a change in volume occurs upon equilibration with water. Because water is soluble in butanol, the equilibration results in an increase in the volume of the butanol phase and a decrease in the volume of the aqueous phase. Also, the total volume after equilibration is less than the sum of the two initial volumes. Accordingly, for studies of extraction efficiencies at various pH's, correction for these factors must be made. To arrive at the proper correction, samples of 25 ml. of water containing varying amounts of acid or base for adjustment of pH were shaken for at least 4 hours with 25 ml. portions of a 0.25 M solution of trifluoroacetylacetone in butanol. The phases were then allowed to separate for eight hours and the volumes and equilibrium pH values of each phase were measured. The results are presented in FIGURE 1 of the drawings. The sharp curves in the highly acid regions are due to the fact that a single phase results when a solution of perchloric acid in water (used for attaining the acid pH) is shaken with the butanol solution. At any pH above the highly acid region, e.g., at above about pH 2.5, the volume correction term can be obtained from FIGURE 1. Thus, when 25 ml. each of aqueous solution and trifluoroacetylacetone solution are initially employed, and the equilibration pH is 6, the organic phase volume upon equilibration is about 27.4 ml. and that of the aqueous phase is about 22. Therefore, in arriving at the extraction efficiency E from the distribution ratio D, the following calculation is employed:

$$E = 100 \left[ \frac{D}{D + \frac{22}{27.4}} \right]$$

The change in volume during extraction with butanol can be avoided by presaturation of butanol with water and of the aqueous metal ion solution with butanol previous to equilibration. Although such a procedure is recommended in experimental runs, for practical applications the presaturation is troublesome. Correction for phase volume changes, as described above, appears to be more expedient.

Figure 2:
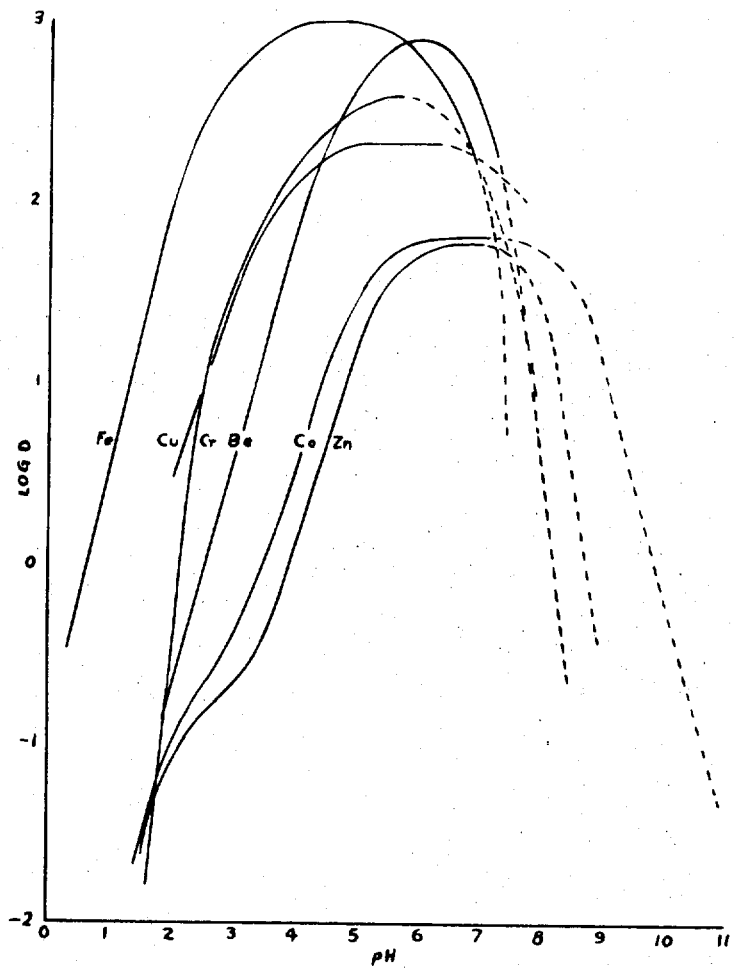

Extraction efficiency with trifluoroacetylacetone/alkanol will vary with the hydrogen ion concentration; and a pH range of from 4 to 7 is generally recommended. Within that range, optimum pH values for each metal species can be readily determined experimentally. For example, a series of studies is made at varying pH's, and the distribution ratio (D) is plotted versus pH. The resulting curve shows that the distribution ratio increases with pH, then levels off to a plateau at higher pH, and finally falls with even higher pH. Optimum extraction occurs in the region of the zero slope, i.e., at the plateau. This is well illustrated in FIGURE 2 of the accompanying drawings, wherein there is shown the distribution of iron (III), copper (II), chromium (III), beryllium, cobalt (II), and zinc between water and a butanol solution of trifluoroaretylacetone as a function of pH. The broken lines indicate precipitation.

Because optimum extraction can be realized over a comparatively broad range of pH, easy commercial operation is facilitated. However, within the broad range, there often occurs a peak in extraction efficiency. In the case of chromium, for example, maximum efficiency is realized at pH of 5.2 to 5.5, with a distribution ratio of about 400 or an extraction efficiency of 99.7%; however, even at a pH of 4.5, the distribution ratio is 215, corresponding to an extraction efficiency of 99.5% for equal phase volumes.

Adjusting the pH of the aqueous solution from which the metal value is to be recovered presents no problem: the usual acids or bases may be used for this purpose, e.g., sulfuric, nitric, hydrochloric, perchloric or acetic acids, sodium acetate, sodium hydroxide, ammonium hydroxide, etc. Because trifluoroacetylacetone, itself, is acidic, it is sometimes advantageous to employ a weakly basic substance, e.g., sodium acetate or ammonium hydroxide, as buffer to compensate for its acidity. Thereby, hydrolysis of the metal salt to a cloudy hydroxide is avoided. A clear, aqueous solution is desirable for facilitating equilibration, of course.

Radiometric or titrimetric studies following the solvent extraction are employed, of course, only when it is desired to arrive at the pH at which there can be realized the greatest extraction efficiency. Once this has been determined, it is necessary only to conduct subsequent extractions at such a pH. Also, when several extraction steps are contemplated, or when substantially complete recovery is not required, it suffices to conduct the extraction at any pH which lies within the broad range of from 4 to 7.

The invention is further illustrated by, but not limited to, the following examples.

EXAMPLE 1

Aliquots (10 ml.) of standard solutions of nickel, cobalt, zinc, cadmium, copper, lead, lanthanum, manganese and magnesium ions were treated with varying amounts of water, and the amounts of 0.5 M sodium hydroxide, 1 M soduim acetate or ammonia buffer (2 M ammonium hydroxide-1 M ammonium nitrate) shown below to give 25 ml. samples having varying pH's. Each sample was equilibrated with 25 ml of a 0.25 M solution of trifluoroacetylacetone in butanol by shaking for 10 minutes. After separation of the resulting phases and measurement of the equilibrium pH, the metal ion remaining in the aqueous phase was determined by titration with 0.05 or 0.005 M (ethylenedinitrilo)tetraacetic acid. The extraction efficiencies shown in the table below were calculated from titration data.

| Metal ion | pH | Additive, ml. | Extraction efficiency, Percent |
|---|---|---|---|
| Ni (II) | 3.0 | None | 7.9 |
|  | 4.2 | 1 NaAc | 81.8 |
|  | 6.3 | 10 NaAc | 98.7 |
|  | 6.4 | 15 NaAc | 98.9 |
|  | 6.6 | 10 NaAc, 2 NaOH | 98.8 |
|  | 6.6 | 10 NaAc, 5 NaOH | 99.0 |
|  | 7.3 | 10 NaOH | 97.6 |
|  | 6.6 | 10 NaAc, 2 buffer | [1] <99.9 |
| Co (II) | 2.9 | None | 28.1 |
|  | 4.3 | 1 NaAc | 83.6 |
|  | 5.7 | 4 NaAc | 98.6 |
|  | 6.2 | 10 NaAc | 98.4 |
|  | 6.4 | 15 NaAc | 99.2 |
|  | 7.3 | 10 NaOH | 98.6 |
|  | 6.5 | 10 NaAc, 1 buffer | [1] <99.9 |
| Zn (II) | 2.6 | None | 4.1 |
|  | 5.5 | 4 NaAc | 96.8 |
|  | 6.1 | 10 NaAc | 98.3 |
|  | 6.4 | 10 NaAc, 1 buffer | 98.9 |
|  | 6.9 | 10 NaAc, 2 buffer | 99.1 |
|  | 7.4 | 10 NaAc, 3 buffer | 99.3 |
|  | 8.0 | 10 NaAc, 4 buffer | 99.5 |
|  | 7.0 | 10 NaOH | 98.9 |
|  | 7.4 | 12 NaOH | 98.9 |
|  | 6.8 | 10 NaAc, 4 buffer | [1] <99.9 |
| Cd (II) | 7.1 | 10 NaAc, 2 buffer | 99.4 |
|  | 7.6 | 10 NaAc, 3 buffer | 98.2 |
|  | 8.4 | 10 NaAc, 4 buffer | 99.5 |
|  | 7.4 | 10 NaOH | 99.9 |
|  | 7.7 | 12 NaOH | 99.7 |
|  | 7.1 | 10 NaAc, 4 buffer | [1] <99.9 |
| Mn (II) [2] | 9.2 | 10 buffer | 97.2 |
|  | 7.8 | 15 NaOH | 99.1 |
| Mc (II) | 6.2 | 5 NaOH | 82.6 |
|  | 7.3 | 10 NaOH | 97.0 |
|  | 9.2 | 10 buffer | 98.2 |
|  | 11 | 15 NaOH | Precipitate |
| La (III) | 5.7 | 5 NaOH | 97.9 |
|  | 7.5 | 10 NaOH | 99.6 |
|  | 7.8 | 12 NaOH | 99.6 |
| Pb (II) | 6.5 | 5 NaOH | 99.5 |
|  | 7.5 | 10 NaOH | 99.7 |
| Cu (II) | 5.1–6.3 | 1–9 NaOH | 99.5 |
|  | 7.7 | 10 NaOH | 99.0 ppt. |

[1] Double extractions.
[2] Hydroxylamine hydrochloride was added to prevent oxidation to Mn (III). The solution was preequilibrated with the solvent-reagent before addition of base.

In all cases, double extractions at pH of about 7 resulted in aqueous phases containing no titratable metal ion (less than 1 drop of 0.005 M (ethylenedinitrilo) tetraacetic acid). The very good results for nickel, manganese, and magnesium are especially significant because the use of chloroform instead of butanol under substantially the same conditions gives only about a 1% extraction of nickel (II), less than 3% of manganese (II), about 3% of magnesium (II).

EXAMPLE 2

The following radiotracer method was used for following the recovery of Cr (III), Zn (II), Fe (III), Co (II) and Be (II) values from aqueous solutions containing these ions.

A 0.025 M chromium (III) chloride solution was prepared by adding 50 μl of a 238 μc/ml Cr$^{51}$ solution to aqueous chromium (III) chloride solution and diluting with distilled water to 1 liter.

A 0.025 M zinc perchlorate solution was prepared from zinc shot, treated with 50 μl of 243 μc/ml of $zinc^{65}$ and diluted to 1 liter.

A 0.025 M iron (III) chloride solution was prepared by treating $FeCl_3 \cdot 6H_2O$ with perchloric acid to remove chloride, diluting with distilled water to considerably less than 1 liter, adding 25 μl of 491 μc/ml. $Fe^{59}$ and diluting to 1 liter with distilled water.

A 0.025 M stock solution of cobalt (II) perchlorate was prepared by treating 5.99 g. of $CoCl_2 \cdot 6H_2O$ with perchloric acid, heating to strong fumes, cooling, adding to the cooled solution 11.5 μc of a chloride-free $Co^{58}$ solution which had been prepared by treating a 459 μc/ml. $Co^{58}$ solution with perchloric acid solution, and diluting to 1 liter with distilled water.

A solution of beryllium perchlorate was prepared by dissolving 0.4547 g. of beryllium metal in concentrated perchloric acid, fuming, diluting, filtering, treating the filtrate with 200 μc of $Be^7$ (as the perchlorate) and diluting to 2 liters with distilled water.

Extraction was conduced by adding a 10.00 ml. aliquot of one of the above solutions to 25.00 ml. of a 0.25 M solution of trifluoroacetylacetone in butanol, adjusting to the desired pH by addition of distilled water and either perchloric acid, aqueous sodium hydroxide, and/or sodium acetate to a volume of 25 ml. Samples of varying pH's were thus prepared. There were shakan on a platform on a platform shaker for 8 hours. After standing for an additional 8 hours, 10.00 ml. aliquots of both phases were removed from each sample and counted in a well-type scintillation counter. Three 5-minute counts were obtained on each sample and averaged. Correction was made for background radiation. Equilibrium pH's were determined on each sample, using a pH meter. The net organic phase radioactivity count was divided by the net aqueous phase count of the same sample and plotted against the equilibrium pH of the sample in order to determine the pH range which was conducive to most recovery of metal value.

For chromium (III), using 0.5 M sodium hydroxide for adjusting the pH, optimum extraction was at pH 5.2 to 5.6, the distribution ratio being 369 at pH 5.20, 409 at pH 5.43 and 375 at pH 5.60. A distribution ratio of 400 is equivalent to an extraction efficiency of 99.7% for equal phase volumes. Extraction efficiency decreases below pH 5.20; at pH 4.50 the distribution ratio is 215 and at pH 3.45, it is only 81.9. It also decreases with increasing pH; at pH 5.85 the distribution ratio is 216 and at pH 6.80 it is 174, with precipitation occurring in the organic phase. Although sodium acetate can be used for attaining the pH, the results are not so good. However, it is useful over a wide range, with a distribution ratio of 149 at pH 4.97 and of 193 at pH 5.90, thus giving over 99% efficiency. It is, therefore, of interest for commercial application wherein it is not desired to employ caustic. A double extraction may be performed to offset the lower extraction efficiency.

For zinc (II), using sodium hydroxide, peak extraction is obtained at a pH of 6 to 7 with an average distribution ratio of 67. This corresponds, after volume correction, to an extraction efficiency of 98.8%.

With iron (III), at pH of 5–7, using 0.5 M sodium hydroxide for adjusting the pH, remarkably efficient extraction occurred. Within this broad range, the average distribution ratio was 970, corresponding to an extraction efficiency of 99.9%.

For cobalt (II) the optimum pH range, employing 0.5 M sodium hydroxide for adjusting the pH, was found to be from 6 to 7, with an average distribution ratio of 64.5, which is equivalent to an extraction efficiency of 98.5%. Enhancement of extraction efficiency was obtained by using sodium acetate or a mixture of sodium hydroxide and sodium acetate to reach the desired equilibrium pH. At a pH of 5.69, using 15 ml. of 1 M sodium acetate to attain this pH, the distribution ratio was 101, corresponding to an extraction efficiency of over 99%.

Beryllium was found to be extracted with highest efficiency from pH 5.5 to 6.5. The average distribution ratio for this pH range is 811, which is equivalent to an extraction efficiency of 99.9% for equal phase volumes. The use of sodium acetate for achieving optimum equilibrium pH range results in sacrifice of efficiency; the distribution ratios drop to about 400.

EXAMPLE 3

Because the data in Example 2 had been obtained by using a long (8 hour) equilibration time, the effect of equilibration time on the distribution of the same metal species was studied by adjusting the pH of aqueous solutions of the metal ion to a pH which had been found in Example 2 to be favorable when sodium acetate was used to attain the pH, and conducting extractions with a 0.25 M solution of trifluoroacetylacetone in butanol by shaking for the periods indicated below:

| Metal ion | pH | Time, min. | Distribution ratio |
|---|---|---|---|
| Co (II) | 5.80 | 0.5 | 90.4 |
|  | 5.80 | 1 | 97.1 |
|  | 5.20 | 5 | 92.2 |
|  | 5.80 | 10 | 97.3 |
| Fe (III) | 5.70 | 0.5 | 919 |
|  | 5.68 | 1 | 782 |
|  | 5.69 | 5 | 1885 |
|  | 5.69 | 10 | 1139 |
| Be (II) | 5.79 | 0.5 | 392 |
|  | 5.79 | 1 | 429 |
|  | 5.79 | 5 | 348 |
|  | 5.79 | 10 | 416 |
| Zn (II) | 5.92 | 0.5 | 62.5 |
|  | 5.91 | 1 | 65.0 |
|  | 5.91 | 5 | 61.8 |
|  | 5.91 | 10 | 63.6 |
| Cr (III) | 5.93 | 0.5 | 5.81 |
|  | 5.91 | 1 | 14.7 |
|  | 5.90 | 5 | 23.1 |
|  | 5.90 | 10 | 28.5 |
|  | 5.90 | 30 | 36.5 |
|  | 5.90 | 60 | 58.1 |

The distribution of copper, cobalt, iron, zinc and beryllium is thus substantially independent of time; equilibrium with these metals is probably reached within a few seconds. The distribution of chromium, however, is time-dependent. It will be noted in Example 2, that upon shaking for 8 hours a distribution ratio of 193 was obtained at a sodium acetate-attained pH of 5.9. Also, although with all of the other metals in the above time study, the phases were all clear, with chromium the aqueous phase was not clear until after shaking for ten minutes. For practical applications with chromium two extractions with equilibrations of 10 minutes each are recommended; these would be as effective as a single 8-hour equilibration.

EXAMPLE 4

This example described the solvent extraction of calcium values.

A 0.025 M calcium solution was prepared by dissolving 2.77 g. anhydrous calcium chloride in 10 ml. of 70% perchloric acid. To this solution there was added 0.40 ml. of a 319 μc./ml. $Ca^{45}$ aqueous solution, and the whole was heated to strong fumes of perchloric acid. After cooling, the resulting solution was diluted to 1 liter with distilled water to give the stock solution which was used in the following experiments.

To 10 ml. of the calcium stock solution there was added 25 ml. of either a 0.25 M solution of trifluoroacetylacetone in butanol or a 0.25 M solution of trifluoroacetylacetone in chloroform. Several test specimens were thus prepared and then adjusted to varying basic pH's by addition of ammonium hydroxide. Finally, distilled water was added in each case to make an aqueous phase volume of 25 ml. Those of the specimens which contained butanol were equilibrated for 10 minutes. Chloroform-containing specimens were equilibrated for 1 hour. At the end of this time, aliquots of each phase were removed and counted. From the results the distribution ratio was determined. There was thus obtained with the butanol solution a distribution ratio of 39.4 at pH 9, which corresponds to an extraction efficiency of about 97%. With the chloroform solution, the distribution ratio was less than 0.01 within the same pH range.

Although, for purposes of comparison, the above examples are limited to the use of butanol as the alkanol solvent, other alcohols of from 4 to 8 carbon atoms may be employed when operating at the pH 4 to 7 range. For example, when, in the extraction of nickel (II), butanol is replaced with isoamyl alcohol, there appears to be no extraction until the highly acidic aqueous solution is adjusted to a pH of at least 4 by addition of sodium acetate. Then, after a few minutes of shaking, a colorless aqueous phase separates from a green organic phase. Similarly, the use of a hexanol or a 2-ethylhexanol solution of trifluoroacetylacetone with aqueous solutions of, for example, nickel, cobalt or zinc at a pH of at least 4, and preferably at pH of from 5 to 7, gives excellent recovery of these metals.

Also, although the above examples shown only calcium, magnesium and beryllium of the Group II–A elements, the method is similarly applicable to strontium and barium. Of the Group II–B elements, only zinc and cadmium are shown above, but the method is likewise useful with mercury II. Similarly, of the Group III elements, lanthanum is used by way of illustration only, since the present method is likewise applicable to scandium and yttrium.

It is to be understood that although the invention has been described with specific reference to particular embodiments thereof, it is not to be so limited since changes and alterations therein may be made which are within the full intended scope of this invention as defined by the appended claims.

What we claim is:

1. The method of extracting of metal values selected from the class consisting of the metals of Groups II–A, II–B, and III–B of the Periodic Arrangement of Elements, copper (II), lead (II), chromium (III), iron (III), cobalt (II), nickel (II) and manganese (II) from aqueous solutions containing said values, which comprises contacting the aqueous solution with a solution of trifluoroacetylacetone in an alkanol of from 4 to 8 carbon atoms as the organic phase to transfer said metal values from the aqueous phase, and separating the resulting metal value-loaded organic phase from the metal value-depleted aqueous phase at an equilibrium pH of 4 to 7.

2. The method defined in claim 1, further limited in that the alkanol is butanol.
3. The method defined in claim 2, further limited in that the metal is a Group II–A metal.
4. The method defined in claim 2, further limited in that the metal is calcium.
5. The method defined in claim 2, further limited in that the metal is magnesium.
6. The method defined in claim 2, further limited in that the metal is beryllium.
7. The method defined in claim 2, further limited in that the metal is a Group II–B metal.
8. The method defined in claim 2, further limited in that the metal is zinc.
9. The method defined in claim 2, further limited in that the metal is cadmium.
10. The method defined in claim 2, further limited in that the metal is a Group III–B metal.
11. The method defined in claim 2, further limited in that the metal is lanthanum.
12. The method defined in claim 2, further limited in that the metal is copper (II).
13. The method defined in claim 2, further limited in that the metal is lead (II).
14. The method defined in claim 2, further limited in that the metal is chromium (III).
15. The method defined in claim 2, further limited in that the metal is iron (III).
16. The method defined in claim 2, further limited in that the metal is cobalt (II).
17. The method defined in claim 2, further limited in that the metal is nickel (II).
18. The method defined in claim 2, further limited in that the metal is manganese (II).

References Cited

UNITED STATES PATENTS 3,201,334  8/1965  Ben-Bassat _____ 75—117

OTHER REFERENCES

Sievers et al., Inorganic Chemistry, vol. 2, No. 4, August 1963, pp. 693–698.

L. DEWAYNE RUTLEDGE, *Primary Examiner.*

TERRY R. FRYER, *Assistant Examiner.*

U.S. Cl. X.R.

75—119, 120, 121; 260—429, 438.1, 438.5, 439